US008443109B2

(12) United States Patent
Paczkowski et al.

(10) Patent No.: US 8,443,109 B2
(45) Date of Patent: May 14, 2013

(54) SELECTION OF A COMMUNICATION DEVICE FOR A USER BY A BASE STATION IN RESPONSE TO RECEIVING A COMMUNICATION SESSION HAND-OFF

(75) Inventors: Lyle Walter Paczkowski, Mission Hills, KS (US); Robert C. Pippert, Lenexa, KS (US); DaeSik Oh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 268 days.

(21) Appl. No.: 12/470,706

(22) Filed: May 22, 2009

(65) Prior Publication Data
US 2010/0296482 A1 Nov. 25, 2010

(51) Int. Cl.
*G06F 15/16* (2006.01)
*H04W 4/00* (2009.01)
*H04W 36/00* (2009.01)

(52) U.S. Cl.
USPC ........... 709/249; 709/227; 709/228; 709/237; 370/331; 455/436; 455/437; 455/438; 455/439; 455/440; 455/442; 455/443; 455/444

(58) Field of Classification Search .................. 709/249; 370/331; 455/436–444
See application file for complete search history.

(56) References Cited

U.S. PATENT DOCUMENTS

| | | | |
|---|---|---|---|
| 2003/0195963 A1 | 10/2003 | Song et al. | |
| 2005/0198384 A1 | 9/2005 | Ansari et al. | |
| 2006/0256751 A1* | 11/2006 | Jagadeesan et al. | 370/331 |
| 2007/0282990 A1 | 12/2007 | Kumar et al. | |
| 2008/0004021 A1* | 1/2008 | Sanjay | 455/436 |
| 2008/0106640 A1* | 5/2008 | Fleischman | 348/441 |
| 2008/0304462 A1 | 12/2008 | Burgess et al. | |

FOREIGN PATENT DOCUMENTS

| | | |
|---|---|---|
| EP | 2 057 792 | 5/2009 |
| ES | 2 316 265 | 4/2009 |

OTHER PUBLICATIONS

3GPP; "3rd Generation Partnership Project; Technical Specification Group Services and Architecture; Feasibility Study on Multimedia Session Continuity; Stage 2 (Release 8);" 3GPP TR 23.893 V8.0.0 (Jun. 2008) Technical Report; Jun. 2008; pp. 1-62; 3GPP Organizational Partners; Valbonne, France.

* cited by examiner

Primary Examiner — Alina N Boutah
Assistant Examiner — Adam Cooney

(57) ABSTRACT

A first base station wirelessly transmits media to a first communication device for a communication session. The first base station hands off the communication session to a second base station. The second base station wirelessly transmits the media to the first communication device for the communication session. In response to the hand-off, the second base station selects a second communication device based on the type of media and transmits a prompt to the first communication device to transfer the communication session to the second communication device. In response to a user instruction, the second base station transmits the media to the second communication device for the communication session.

20 Claims, 9 Drawing Sheets

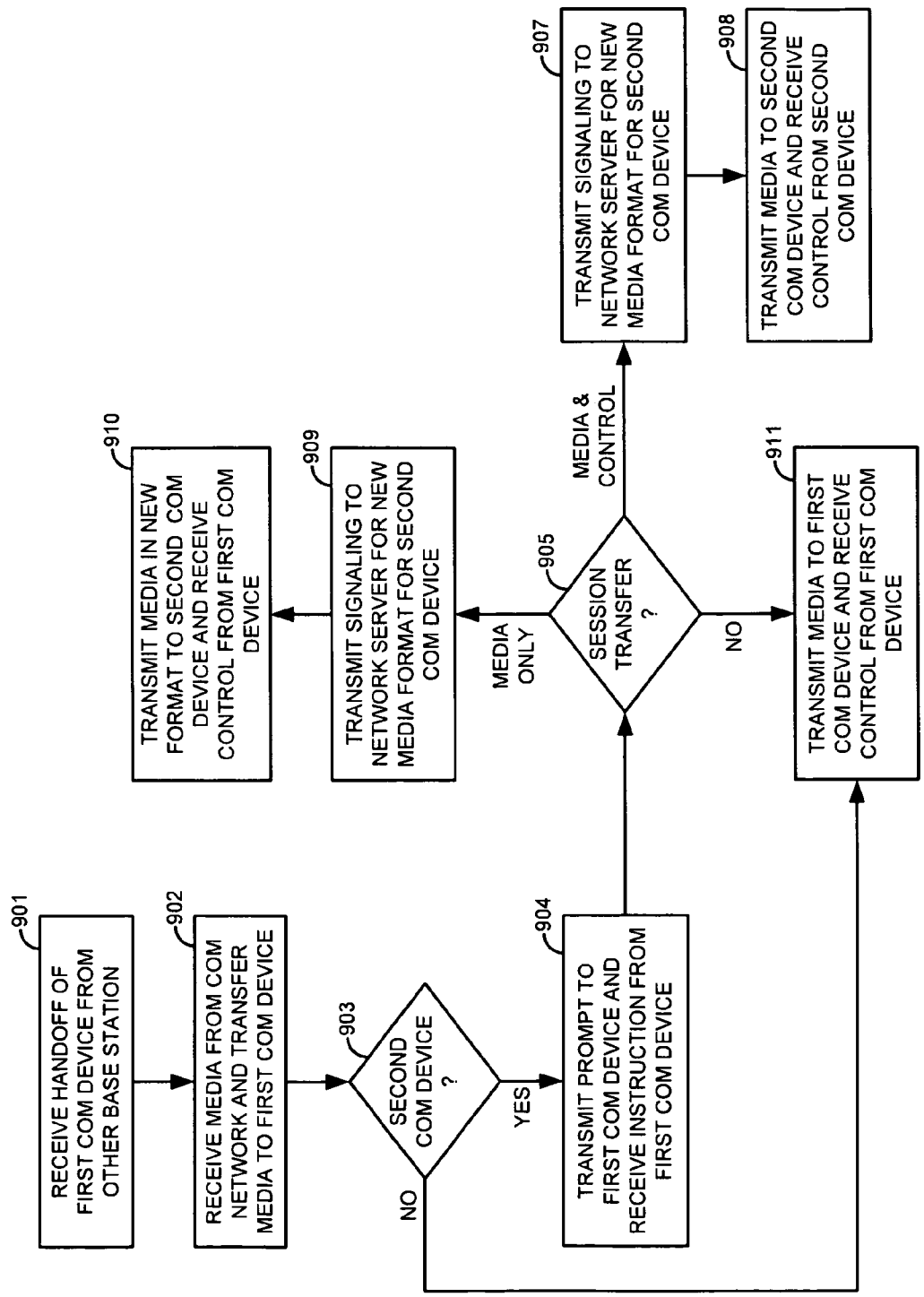

US 8,443,109 B2

SELECTION OF A COMMUNICATION DEVICE FOR A USER BY A BASE STATION IN RESPONSE TO RECEIVING A COMMUNICATION SESSION HAND-OFF

TECHNICAL BACKGROUND

A private base station can be installed in a home and connected to the Internet. The private base station is able to accept communication session hand-offs from public base stations. For example, a user that is driving an automobile may engage in a voice call by using a wireless telephone that communicates with a public base station. When the user arrives at home, the public base station will hand-off the wireless telephone to the private base station. The user seamlessly continues their voice call through the private base station.

Many homes also have a Local Area Network (LAN) that is connected to various devices, such as computers, telephones, and televisions. The LAN is often coupled to a modem that provides Internet access. Thus, the various devices communicate with one another through the LAN and communicate over the Internet through the modem. The private base station typically communicates over the Internet through the modem.

OVERVIEW

A first base station wirelessly transmits media to a first communication device for a communication session. The first base station hands off the communication session to a second base station. The second base station wirelessly transmits the media to the first communication device for the communication session. In response to the hand-off, the second base station selects a second communication device based on the type of media and transmits a prompt to the first communication device to transfer the communication session to the second communication device. In response to a user instruction, the second base station transmits the media to the second communication device for the communication session.

BRIEF DESCRIPTION OF THE DRAWINGS

FIG. 9 illustrates the operation of the base station.

DETAILED DESCRIPTION

Figure 1:
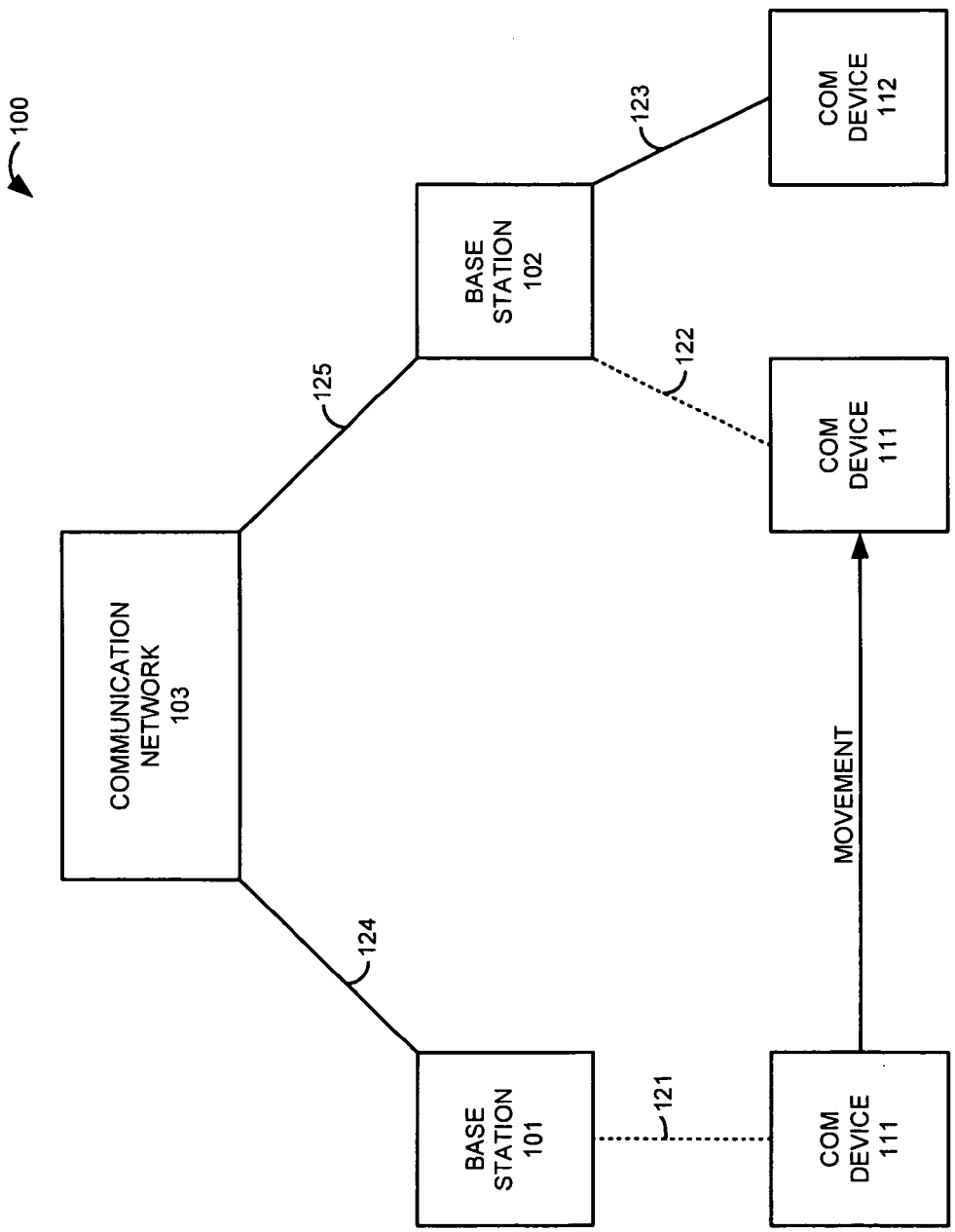
FIG. 1 illustrates a wireless communication system.

FIG. 1 illustrates wireless communication system 100. Wireless communication system 100 includes base stations 101-102, communication network 103, and communication devices 111-112. Communication device 111 comprises a wireless telephone, internet appliance, computer, media player, or some other wireless communication device. Communication device 112 comprises a telephone, television, computer, audio system, or some other media device.

Base station 101 and communication network 103 communicate over communication link 124. Base station 102 and communication network 103 communicate over communication link 125. Base station 101 and communication device 111 communicate over wireless link 121. After communication device 111 moves, base station 102 and communication device 111 communicate over wireless link 122. Subsequently, base station 102 and communication device 112 communicate over communication link 123.

Figure 2:
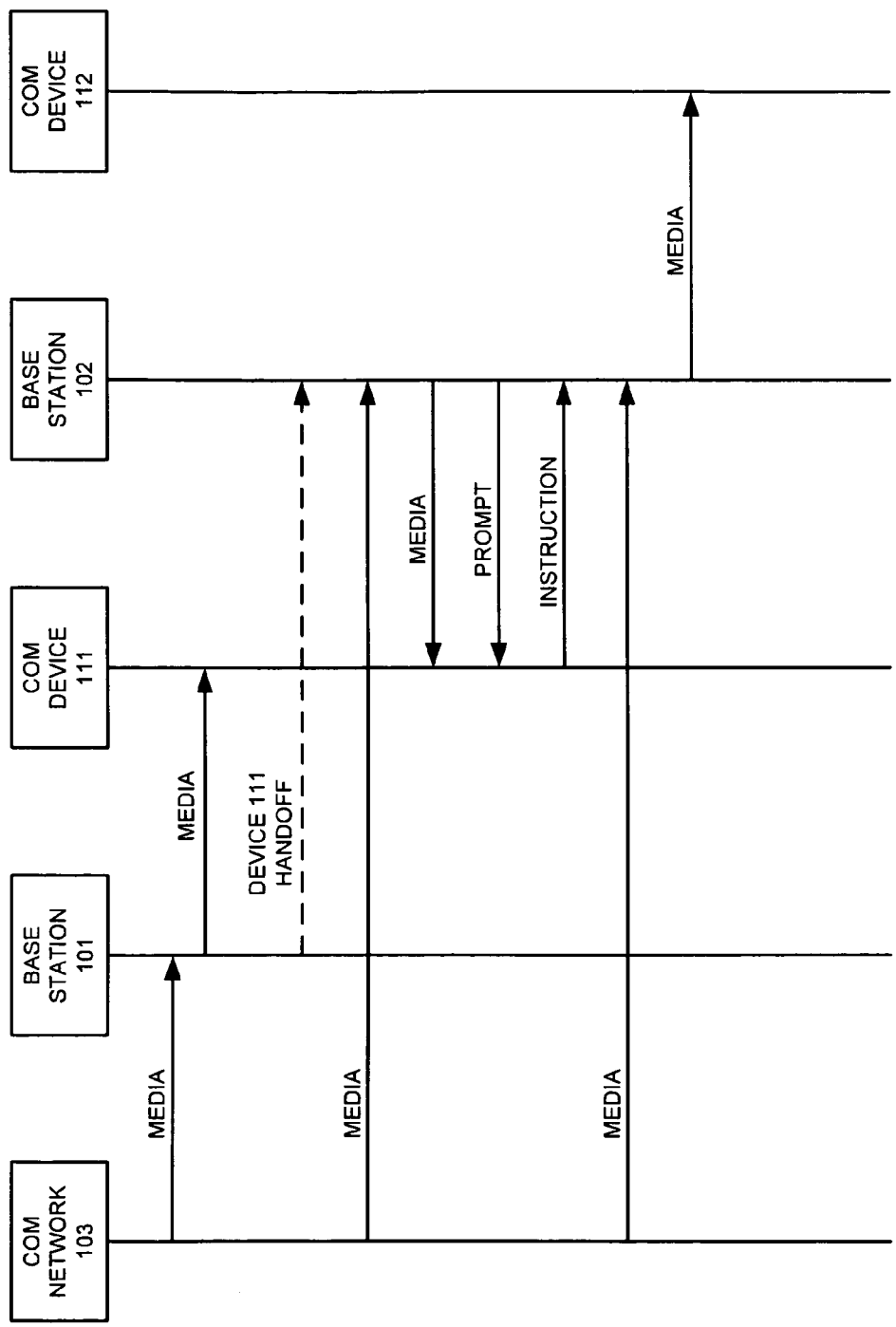
FIG. 2 illustrates the operation of the wireless communication system.

FIG. 2 illustrates the operation of wireless communication system 100. The operation starts with a media communication session in-progress where communication network 103 transmits media to base station 101, and base station 101 wirelessly transmits the media to communication device 111. The media could be voice, music, video, email, web pages, or some other media content.

Due to the movement shown on FIG. 1, base station 101 hands-off the communication session and communication device 111 to base station 102. After the hand-off, communication network 103 transmits the media to base station 102, and base station 102 wirelessly transmits the media to communication device 111.

In response to the hand-off, base station 102 selects another communication device for the communication session based on a type of media. Typically, the other communication device is a proximate media device that is able to communicate with base station 102 and that is suitable for the type of media. Although there are many examples, the other communication device might be a television if the media is video, a computer if the media is email, and an audio system if the media is a voice call. In this example, communication device 112 is selected. Note that multiple devices could be selected, but the number has been restricted for clarity.

In response to the selection, base station 102 transmits a prompt to communication device 111 to transfer the communication session to communication device 112. In response to a user input, communication device 111 transmits an instruction to base station 102. In this example, the user decides to transfer the communication session to communication device 112, and the instruction indicates this decision. Base station 102 now receives the media, and response to the instruction, base station 102 transfers the media to communication device 112.

Figure 3:
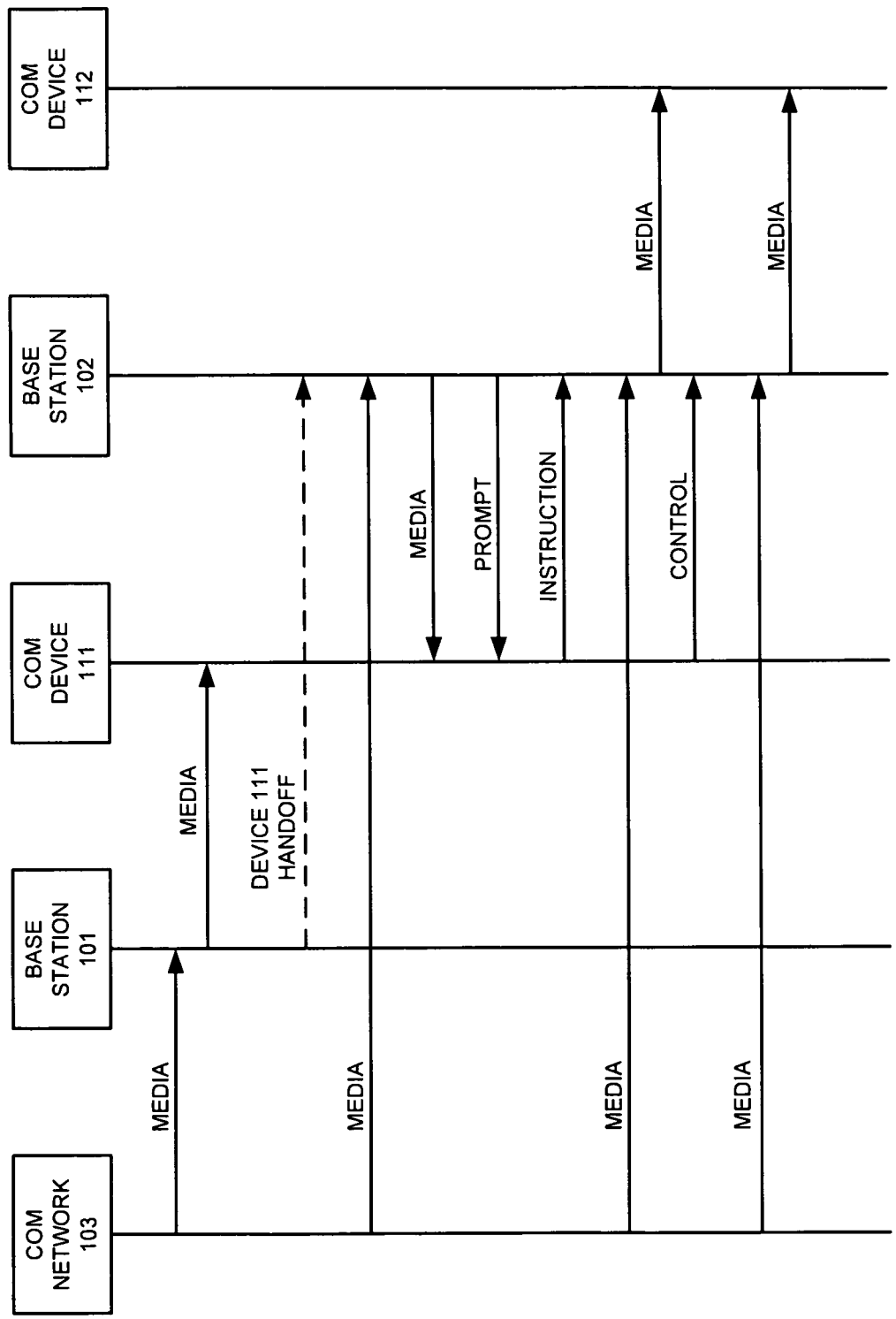
FIG. 3 illustrates the operation of the wireless communication system.

FIG. 3 illustrates an alternative operation of wireless communication system 100, although this alternative is not required in all examples. The alternative operation also starts with a media communication session in-progress where communication network 103 transmits media to base station 101, and base station 101 wirelessly transmits the media to communication device 111. The media could be voice, music, video, email, web data, or some other media content.

Due to the movement shown on FIG. 1, base station 101 hands-off the communication session and communication device 111 to base station 102. After the hand-off, communication network 103 transmits the media to base station 102, and base station 102 wirelessly transmits the media to communication device 111. In response to the hand-off, base station 102 selects another communication device for the communication session based on the type of media. Typically, the other communication device is a proximate media device that is able to communicate with base station 102 and that is suitable for the type of media. In this example, communication device 112 is selected. Multiple devices might be selected in other examples.

In response to the selection, base station 102 transmits a prompt to communication device 111 to transfer the communication session to communication device 112. The prompt provides multiple options: 1) retain media delivery and session control with communication device 111, 2) transfer media delivery and session control to communication device 112, or 3) transfer media delivery to communication device 112, but retain session control with communication device 111. Various other user options, such as transferring the media to both devices, may also be implemented but are restricted here for clarity.

In response to a user input, communication device 111 transmits an instruction to base station 102. In this example, the user selects the third option (transfer media delivery to communication device 112 and retain session control with communication device 111) and the instruction indicates this decision. Base station 102 now receives the media, and in response to the instruction, base station 102 transfers the media to communication device 112.

Base station 102 also receives control from communication device 111. The control could be a request to visit another web site, change a video channel, place a voice call on hold, or some other session control exerted by the user through communication device 111. Base station 102 then receives the media, and response to the control, transfers the media to communication device 112 according to the control.

Figure 4:
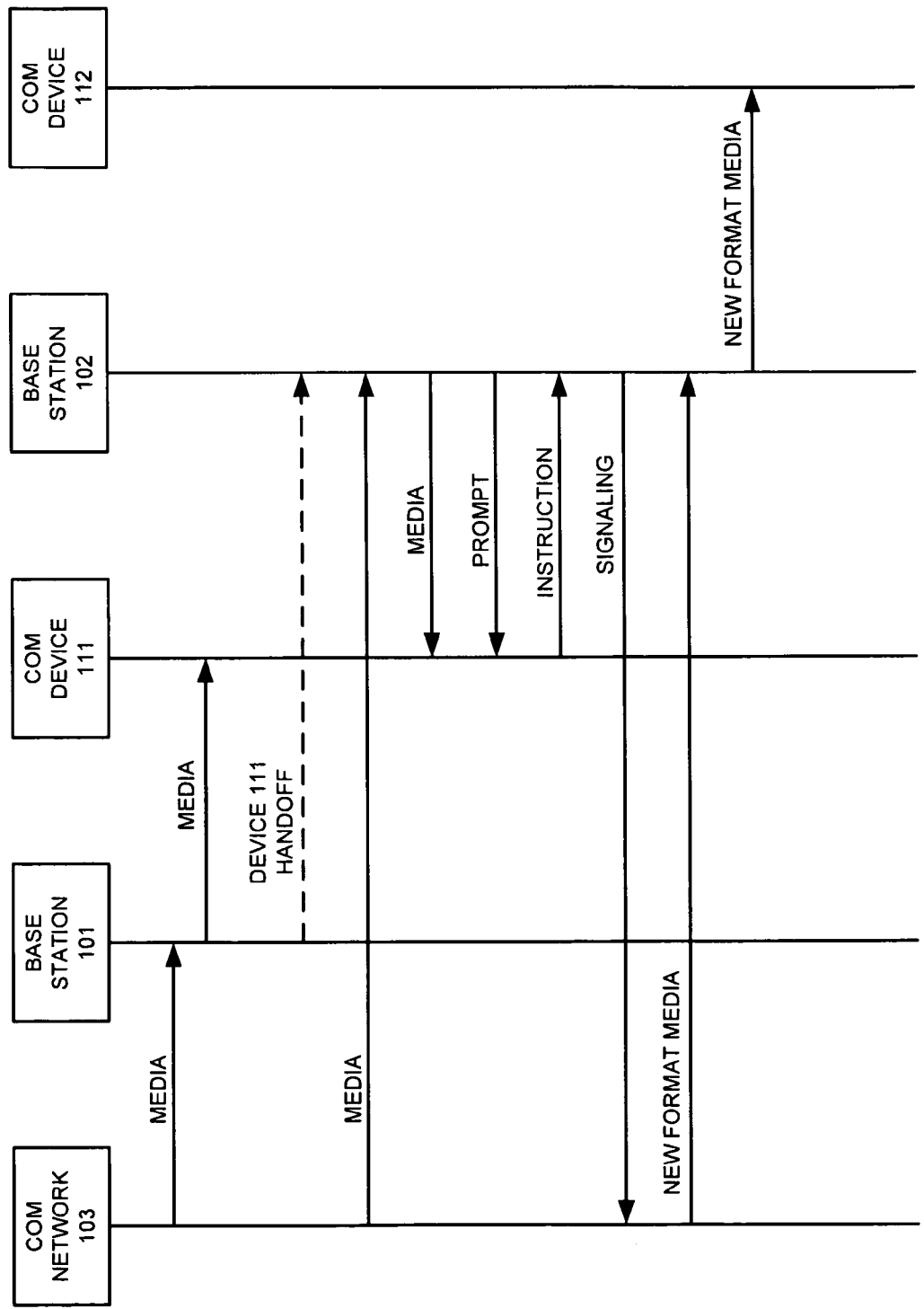
FIG. 4 illustrates the operation of the wireless communication system.

FIG. 4 illustrates an alternative operation of wireless communication system 100, although this alternative is not required in all examples. The alternative operation also starts with a media communication session in-progress where communication network 103 transmits media to base station 101, and base station 101 wirelessly transmits the media to communication device 111. The media could be voice, music, video, email, web data, or some other media content.

Due to the movement shown on FIG. 1, base station 101 hands-off the communication session and communication device 111 to base station 102. After the hand-off, communication network 103 transmits the media to base station 102, and base station 102 wirelessly transmits the media to communication device 111. In response to the hand-off, base station 102 selects another communication device for the communication session based on the type of media. Typically, the other communication device is a proximate media device that is able to communicate with base station 102 and that is suitable for the type of media. Base station 102 also identifies any media formatting options for the selected communication device 112. In this example, communication device 112 is selected. Multiple devices might be selected in other examples.

In response to the selection, base station 102 transmits a prompt to communication device 111 to transfer the communication session to communication device 112. The prompt provides multiple options: 1) retain media delivery with communication device 111, 2) transfer media delivery in the current format to communication device 112, or 3) transfer media delivery in a new format to communication device 112. The new format could be higher resolution video, higher fidelity audio, or some other media formatting change.

In response to a user input, communication device 111 transmits an instruction to base station 102. In this example, the user selects the third option (transfer media delivery in a new media format to communication device 112) and the instruction indicates this decision. In response to the instruction, base station 102 transfers signaling to communication network 103 requesting the media in the new format. A media server in communication network 103 processes the signaling to begin the transfer of the media in the new format. Base station 102 now receives the media in the new format, and in response, transfers the media in the new format to communication device 112.

Although not required, the media server in communication network 103 might address the media in the new format for delivery to communication device 112. The address of communication device 112 could be in the signaling from base station 102 or could be in a table of devices and addresses maintained by the media server. In addition, the media server in communication network 103 might continue to transfer the media in the old format and addressed to communication device 111. Base station 102 could transfer this media in the old format to communication device 111 simultaneously with the transfer of the media in the new format to communication device 112.

Figure 5:
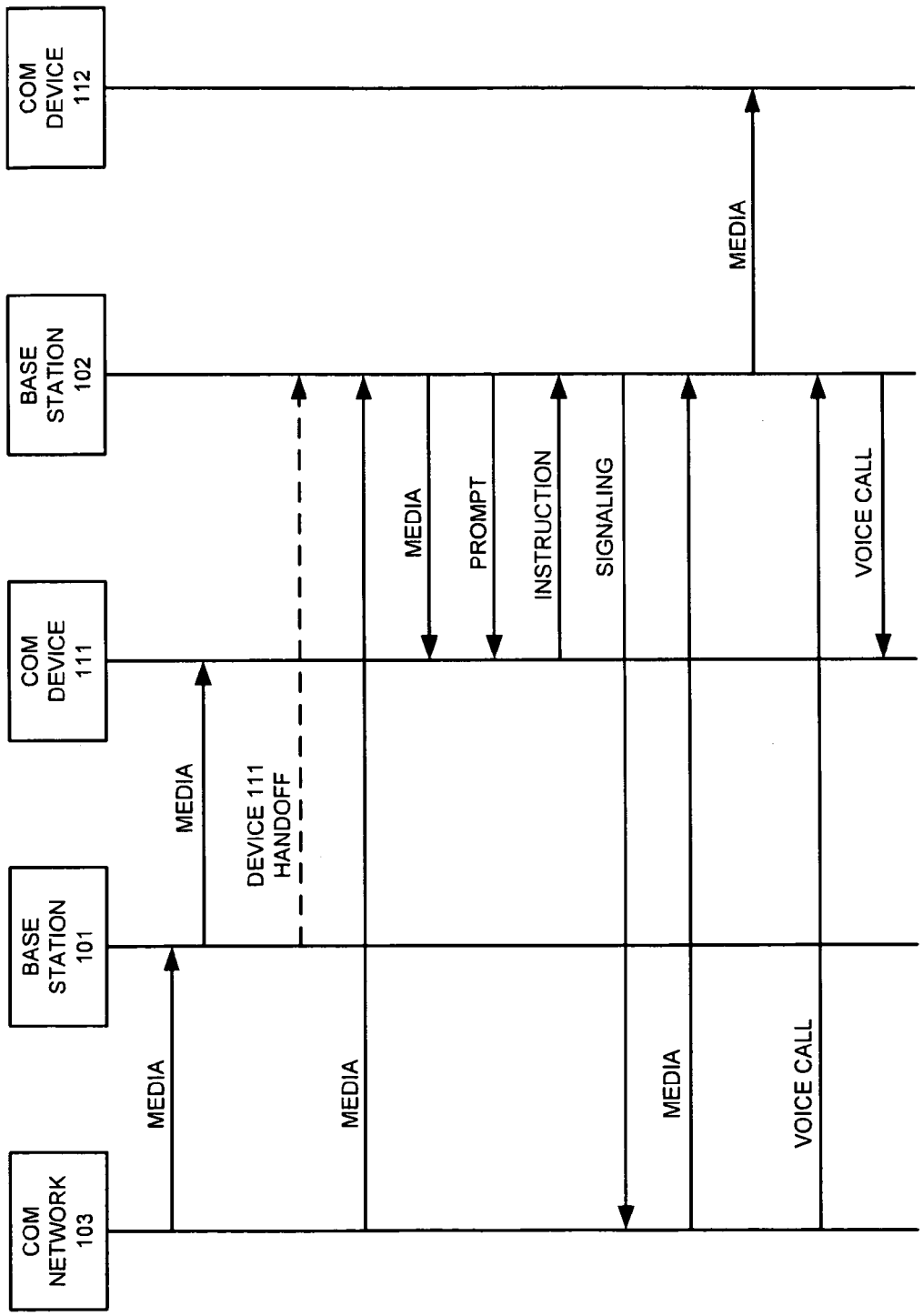
FIG. 5 illustrates the operation of the wireless communication system.

FIG. 5 illustrates an alternative operation of wireless communication system 100, although this alternative is not required in all examples. The alternative operation also starts with a media communication session in-progress where communication network 103 transmits media to base station 101, and base station 101 wirelessly transmits the media to communication device 111. The media could be voice, music, video, email, web data, or some other media content.

Due to the movement shown on FIG. 1, base station 101 hands-off the communication session and communication device 111 to base station 102. After the hand-off, communication network 103 transmits the media to base station 102, and base station 102 wirelessly transmits the media to communication device 111. In response to the hand-off, base station 102 selects another communication device for the communication session based on the type of media. Typically, the other communication device is a proximate media device that is able to communicate with base station 102 and that is suitable for the type of media. Base station 102 also identifies any media formatting options for the selected communication device 112. In this example, communication device 112 is selected.

In response to the selection, base station 102 transmits a prompt to communication device 111 to transfer the communication session to communication device 112. In response to a user input, communication device 111 transmits an instruction to base station 102. In this example, the user decides to transfer media delivery to communication device 112 and the instruction indicates this decision.

In response to the instruction, base station 102 transfers signaling, such as a Session Initiation Protocol (SIP) message, to communication network 103 requesting session transfer to communication device 112. A media server in communication network 103 processes the signaling to begin the transfer of the media now addressed to selected communication device 112. The media server may also transfer the media in a new format. Base station 102 now receives the media with the new address, and in response, transfers the media to communication device 112.

During the media transfer to communication device 112, communication network 103 transfers a voice call request to base station 102 for delivery to communication device 111. Base station 102 wirelessly transfers the voice call request to communication device 111 and device 111 accepts the voice call. Communication network 103 then exchanges audio for the voice call with base station 102, and base station 102 wirelessly exchanges the audio for the voice call with communication device 111. Thus, the voice call with communication device 111 occurs simultaneously with the media transfer to communication device 112.

Referring back to FIG. 1, base stations 101-102 comprise an antenna and RF communication circuitry for wireless communication. The RF communication circuitry typically includes an amplifier, filter, RF modulator, and signal processing circuitry. Base stations 101-102 may also comprise additional communication interfaces, processing circuitry, memory devices, software, cabling, power supplies, and other communication apparatus—including combinations thereof.

Communication network 103 comprises communication equipment and links. The equipment may include call processors, routers, servers, switches, memory devices, software, processing circuitry, cabling, power supplies, communication interfaces, and other communication apparatus—including combinations thereof. Communication network 103 typically includes a media server that interacts with base stations 101-102, although the media may come from external sources. Communication network 103 may be a single discreet system or may be comprised of multiple systems and networks. For example, communication network 103 may include telephony networks, data networks, the Internet, and other systems.

Communication device 111 could be a wireless telephone, internet appliance, computer, e-book, media player, or some other wireless communication device. Communication device 111 comprises an antenna and RF communication circuitry for wireless communication. The RF communication circuitry typically includes an amplifier, filter, RF modulator, and signal processing circuitry. Communication device 111 may also comprise additional processing circuitry, memory device, software, user interface, power supply, and other communication apparatus—including combinations thereof.

Communication device 112 could be a telephone, television, computer, audio system, or some other media device. Communication device 112 may utilize wireless, optical, electrical, or some other form of communication. Communication device 112 comprises a communication interface, processing circuitry, memory device, software, user interface, power supply, and other communication apparatus—including combinations thereof.

Wireless links 121-122 use the air or space as the transport media. Wireless links 121-122 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Communication links 123-125 use metal, glass, air, space, or some other material as the transport media. Communication links 123-125 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 123-125 could be direct links or may include intermediate networks, systems, or devices.

Figure 6:
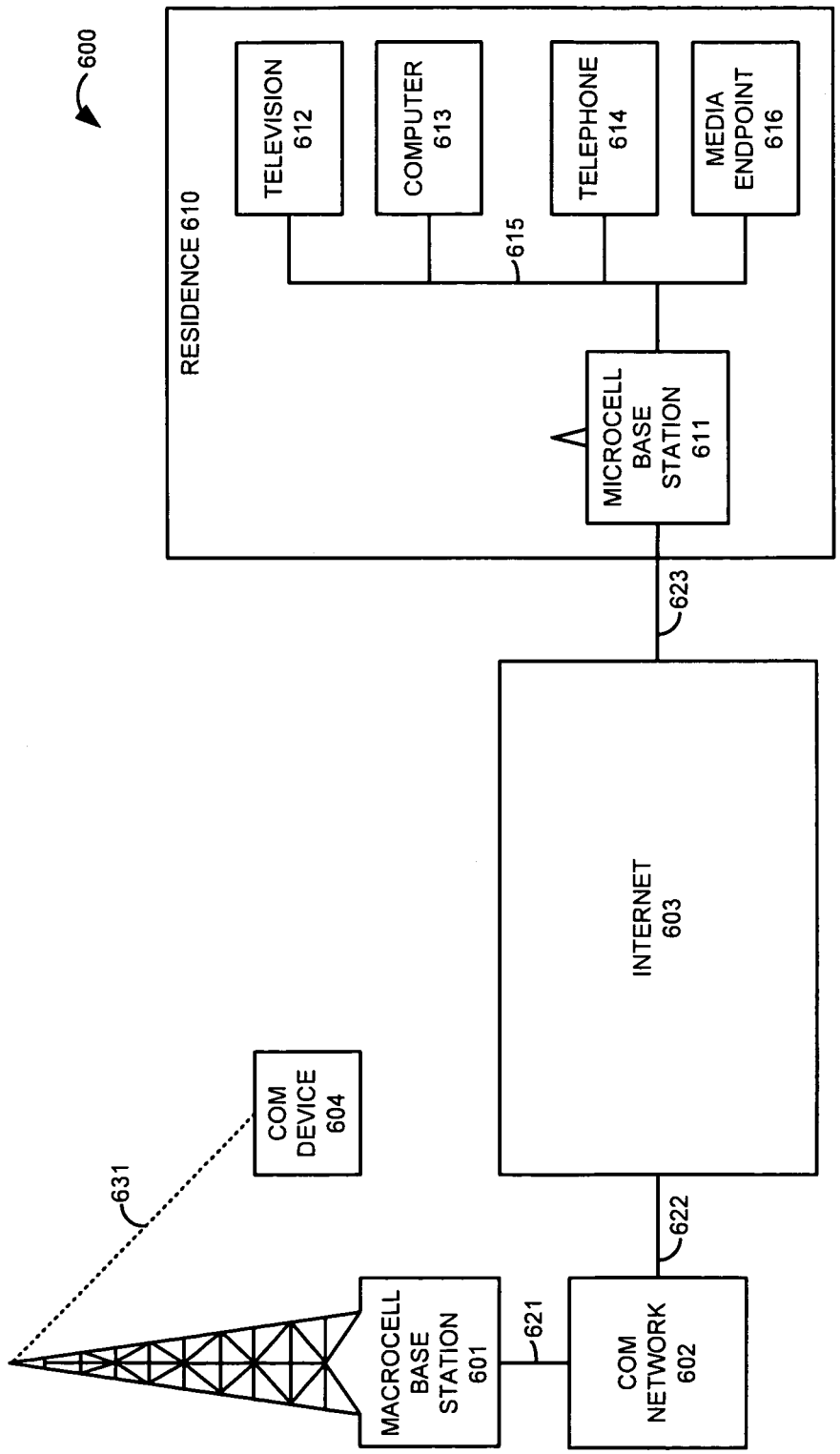
FIG. 6 illustrates a wireless communication system.

FIG. 6 illustrates wireless communication system 600. Wireless communication system 600 comprises macrocell base station 601, communication network 602, Internet 603, wireless communication device 604, and residence 610. Located at residence 610 are microcell base station 611, television 612, computer 613, telephone 614, Ethernet LAN 615, and media endpoint 616. The following devices communicate over Ethernet LAN 615: microcell base station 611, television 612, computer 613, telephone 614, and media endpoint 616.

In a first operation, wireless communication device 604 is engaged in a video communication session where communication network 602 transmits video media to wireless communication device 604 through macrocell base station 601.

Figure 7:
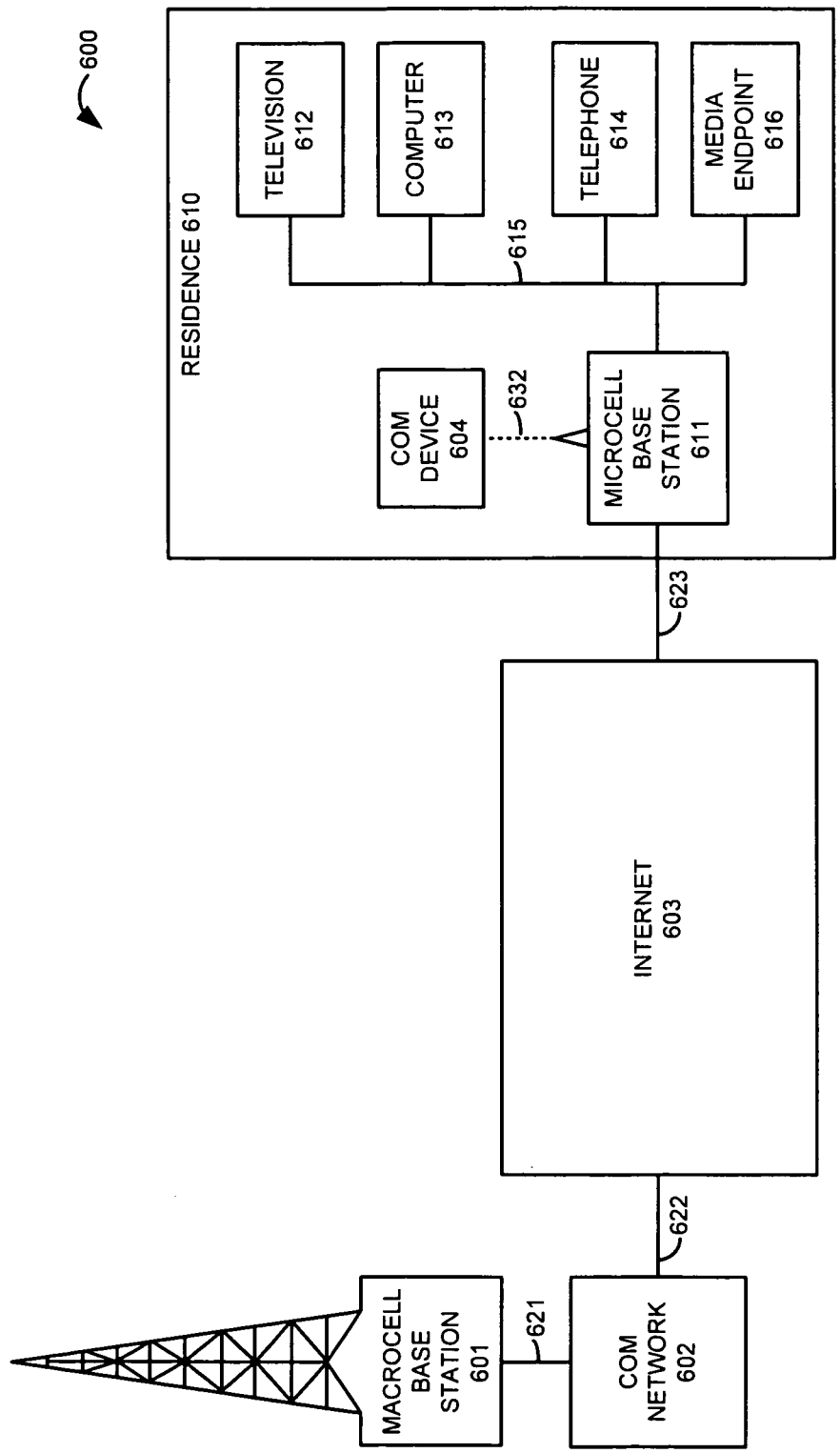
FIG. 7 illustrates the wireless communication system.

FIG. 7 illustrates wireless communication system 600 at a later time. On FIG. 7, wireless communication device 604 has moved to residence 610. In response to the move, macrocell base station 601 has handed wireless communication device 604 over to microcell base station 611. Thus, wireless communication device 604 and microcell base station 611 now communicate over CDMA link 632. Wireless communication device 604 remains engaged in the video communication session where communication network 602 transmits video media to wireless communication device 604 through Internet 603 and microcell base station 611.

In response to the handoff, microcell base station 611 determines if any devices currently operating on LAN 615 are suitable for the video communication session. This could be accomplished by a preconfigured table that associates devices with media types and through a status information exchange over LAN 615. In this example, television 612, computer 613, and media endpoint 616 are operating on LAN 615 and are able to handle the video communication session.

Microcell base station 611 transmits a prompt to wireless communication device 604 indicating that television 612, computer 613, and media endpoint 616 are candidates to display the video media for the video communication session. Wireless communication device 604 displays the prompt to the user, and in this example, the user selects television 612. Wireless communication device 604 transfers an instruction back to microcell base station 611 to transfer the video media to television 612. In response to the instruction, microcell base station 611 transfers signaling to communication network 602 requesting a session transfer to television 612. A media server in communication network 602 processes the signaling to begin transferring the video formatted and addressed for television 612. Microcell base station 611 receives the video from Internet 603 and transfers the video to television 612 based on the new addressing. Television 612 displays the video in the new format.

Referring back to FIG. 6 to discuss a second operation, wireless communication device 604 is now engaged in a voice communication session where communication network 602 exchanges audio media with wireless communication device 604 through macrocell base station 601.

FIG. 7 now illustrates wireless communication system 600 at a later time for the second operation. Wireless communication device 604 has moved to residence 610, and in response, macrocell base station 601 has handed wireless communication device 604 over to microcell base station 611. Thus, wireless communication device 604 and microcell base station 611 now communicate over CDMA link 632. Wireless communication device 604 remains engaged in the voice communication session where communication network 602 exchanges the audio media with wireless communication device 604 through Internet 603 and microcell base station 611.

In response to the handoff, microcell base station 611 determines if any devices currently operating on LAN 615 are suitable for the voice communication session. In this example, both computer 613 and telephone 614 are operating on LAN 615 and are able to handle the voice communication session. Microcell base station 611 transmits a prompt to wireless communication device 604 indicating that computer 613 and telephone 614 are candidates to exchange the audio media for the voice communication session. Wireless communication device 604 displays the prompt to the user, and in this example, the user selects telephone 614. Wireless communication device 604 transfers an instruction back to microcell base station 611 to exchange the audio media with telephone 614.

In response to the instruction, microcell base station 611 begins to exchange the audio media with telephone 614 over LAN 615. Thus, microcell base station 611 exchanges audio with communication network 602 and exchanges the audio with telephone 614. In this example, control over the voice communication session is retained in wireless communication device 604, although device 604 is no longer used to exchange audio. Thus, the user may exert session control through wireless communication device 604 while exchanging the audio through telephone 614. For example, the user listens to and speaks into telephone 614, but may terminate the voice session by operating wireless communication device 611. In another example, the user listens to and speaks into telephone 614, but may conference in a third party by operating wireless communication device 611.

Figure 8:
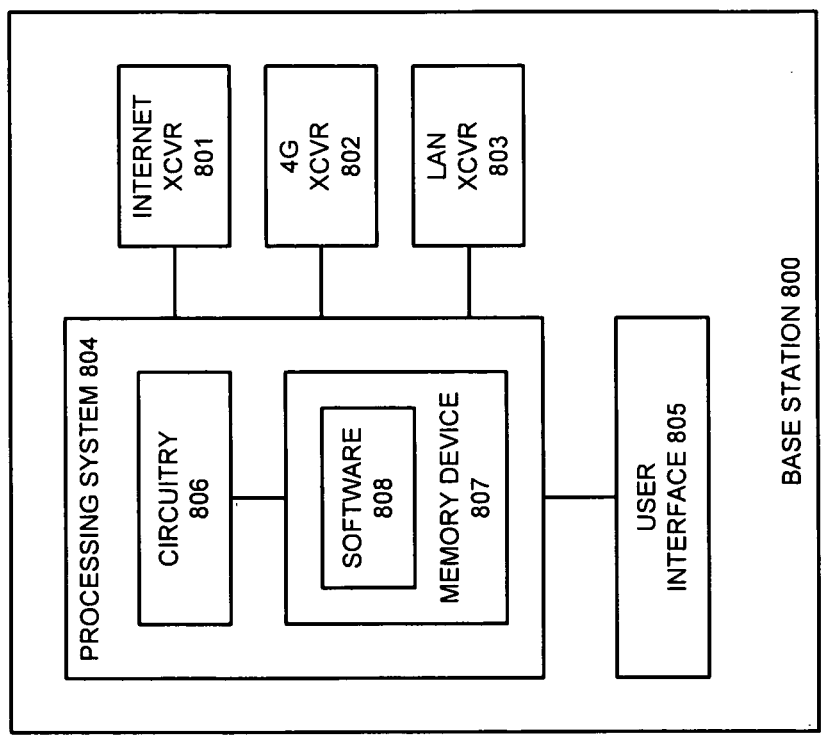
FIG. 8 illustrates a base station.

FIG. 8 illustrates base station 800. Base station 800 is an example of base stations 102 and 611, although base stations 102 and 611 may use alternative configurations. Base station 800 comprises transceivers 801-803, processing system 804, and user interface 805. Processing system 804 comprises processing circuitry 806 and memory device 807 that stores operating software 808. Processing system 804 is linked to transceivers 801-803 and user interface 805. Base station 800 may include other well-known components that are not shown for clarity, such as power circuitry and an enclosure.

Internet transceiver 801 comprises a data interface that includes a cable modem, digital subscriber line modem, wireless modem, optical modem, and/or some other Internet access component. The term "4G" refers to fourth generation wireless communication technologies, such as WIMAX, LTE, and others. 4G transceiver 802 comprises an antenna, RF transceiver, signal processing circuitry, and/or some other wireless network interface. Local Area Network (LAN) transceiver 803 comprises an Ethernet card, wireless fidelity card, and/or some other LAN component.

User interface 805 comprises components that interact with a user. User interface 805 may include buttons, lights, display, touch screen, or some other user input/output apparatus—including combinations thereof.

Processing circuitry 806 comprises microprocessor and other circuitry that retrieves and executes operating software 808 from memory device 807. Memory device 807 comprises a computer-readable storage medium, such as a disk drive, flash drive, data storage circuitry, or some other memory apparatus. Processing circuitry 806 is typically mounted on a circuit board that may also hold memory device 807 and portions of user interface 805 and transceivers 801-803.

Operating software 808 comprises computer programs, firmware, or some other form of computer-readable processing instructions. Operating software 808 may include an operating system, utilities, drivers, network interfaces, applications, or some other type of software. When executed by processing circuitry 806, operating software 808 directs processing system 804 to operate base station 800 as described herein for base stations 102 and 611. In particular, operating software 808 directs processing system 804 to accept communication session hand-offs from other base stations, select other media devices based on media types for the communication sessions, and interact with the user and communication network to transfer the communication sessions to the selected media devices as described herein.

FIG. 9 illustrates the operation of base station 800. The operation starts with processing system 804 accepting the hand-off of a first communication device from another base station during a communication session (901). To facilitate this hand-off, processing system 804 typically receives signaling from a network control system through internet transceiver 801 and receives signaling from the first communication device through 4G transceiver 802. After the hand-off, processing system 804 receives media for the communication session through internet transceiver 801 and wirelessly transfers the media to the first communication device through 4G transceiver 802 (902). The media could be voice, music, video, email, web data, or some other media content.

In response to the hand-off, processing system 804 determines if a second communication device is available that would be suitable for the media (903). To make the determination, processing system 804 maintains a data structure in memory device 807 that associates various media types with various communication devices and that associates these communication devices with their current status. For example, the data structure might associate video media with both a television and a computer and list the television status as unavailable and the computer status as available. The device status could be determined based on the ability to presently communicate with the device over LAN transceiver 803.

If there is no available communication device for the media type (903), then processing system 804 continues to receive the media through network interface 801, transfer the media to the first communication device through 4G transceiver 802, and receive user control information through 4G transceiver 802 (911). If there is an available communication device for the media type (903), then processing system 804 transfers a prompt to the first communication device through 4G transceiver 802 (904). The prompt indicates menu options for user selection that include: 1) retain media delivery and session control with the first communication device, 2) transfer media delivery and session control to the second communication device, or 3) transfer media delivery to the second communication device, but retain session control with the first communication device. In response to the prompt, processing system 804 receives a user instruction from the first communication device through 4G transceiver 802 (904).

If the user instruction is not to transfer the session by retaining media delivery and session control with the first communication device (905), then processing system 804 continues to receive the media through internet transceiver 801, transfer the media to the first communication device through 4G transceiver 802, and receive user control information through 4G transceiver 802 (911).

If the user instruction is to transfer the session by transferring media delivery and session control to the second communication device (905), then processing system 804 transfers SIP signaling to a network server requesting media that is formatted and addressed for the second communication device (907). Processing system 804 then receives the media through internet transceiver 801, transfers the media to the second communication device through LAN transceiver 803, and receives user control information through LAN transceiver 803 (908).

If the user instruction is to partially transfer the session by transferring media delivery to the second communication device and retaining session control at the first communication device (905), then processing system 804 transfers SIP signaling to a network server requesting media formatted and addressed for the second communication device (909). Processing system 804 then receives the media through internet transceiver 801, transfers the media to the second communication device through LAN transceiver 803, and receives user control information through 4G transceiver 802 (910).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   in a first base station, wirelessly transmitting media to a first communication device for a communication session;
   handing off the communication session from the first base station to a second base station;
   in the second base station, wirelessly transmitting the media to the first communication device for the communication session;
   in the second base station and in response to the hand-off, selecting a second communication device based on a type of the media, identifying media formatting options for the second communication device, and transmitting a prompt comprising the media formatting options to the first communication device to transfer the communication session to the second communication device; and
   in the second base station, receiving a user instruction from the first communication device comprising a selection from among the media formatting options to transfer the communication session to the second communication device, and in response, transmitting the media in a selected media format to the second communication device for the communication session.

2. The method of claim 1 wherein:
   transmitting the prompt to the first communication device comprises transmitting the prompt to transmit the media for the communication session to the second communication device and to retain control over the communication session in the first communication device;
   receiving the user instruction from the first communication device comprises receiving the user instruction to transmit the media for the communication session to the second communication device and to retain control over the communication session in the first communication device; and further comprising
   in the second base station, during the transmission of the media to the second communication device, receiving a control instruction for the media session from the first communication device and implementing the control instruction.

3. The method of claim 2 wherein the media comprises voice and the control instruction comprises a voice call instruction.

4. The method of claim 2 wherein the media comprises video and the control instruction comprises a video session instruction.

5. The method of claim 1 further comprising, in the second base station, transferring signaling to a communication network server requesting the media formatted and addressed for the second communication device.

6. The method of claim 1 wherein transmitting the media to the second communication device comprises transmitting the media from the second base station over a local area network to the second communication device.

7. The method of claim 1 wherein the first communication device comprises a mobile communication device, the second communication device comprises a telephone, and the media comprises voice.

8. The method of claim 1 wherein the first communication device comprises a mobile communication device, the second communication device comprises a television, and the media comprises video.

9. The method of claim 1 wherein the first communication device comprises a mobile communication device, the second communication device comprises a computer, and the media comprises email.

10. The method of claim 1 wherein the first base station comprises a public macro-cell base station and the second base station comprises a residential micro-cell base station.

11. A base station comprising:
    a network transceiver configured to receive control signaling for a communication session from a network;
    a processing system configured to process the control signaling for the communication session to accept a hand-off of a first communication device from another base station;
    the network transceiver configured to receive media for the communication session from the network;
    a wireless transceiver configured to wirelessly transmit the media to the first communication device for the communication session;
    the processing system configured to, in response to the hand-off, select a second communication device based on a type of the media, identify media formatting options for the second communication device, and initiate a prompt comprising the media formatting options to transfer the communication session to the second communication device;
    the wireless transceiver configured to transmit the prompt to the first communication device and receive a user instruction comprising a selection from among the media formatting options from the first communication device to transfer the communication session to the second communication device;
    the processing system configured to process the user instruction to initiate the transfer of the communication session; and
    a local transceiver configured to transmit the media in a selected media format to the second communication device for the communication session.

12. The base station of claim 11 wherein:
    the prompt to the first communication device comprises a prompt to transmit the media for the communication session to the second communication device and to retain control over the communication session in the first communication device;
    the user instruction from the first communication device comprises a user instruction to transmit the media for the communication session to the second communication device and to retain control over the communication session in the first communication device;
    the wireless transceiver is configured to receive a control instruction for the communication session from the first communication device during the transmission of the media to the second communication device; and
    the processing system is configured to initiate implementation of the control instruction.

13. The base station of claim 12 wherein the media comprises voice and the control instruction comprises a voice call instruction.

14. The base station of claim 12 wherein the media comprises video and the control instruction comprises a video session instruction.

15. The base station of claim 11 wherein the processing system is configured to transfer signaling through the network transceiver to a network server requesting the media formatted and addressed for the second communication device.

16. The base station of claim 11 wherein the local transceiver is configured to transmit the media to the second communication device over a local area network.

17. The base station of claim 11 wherein the first communication device comprises a mobile communication device, the second communication device comprises a telephone, and the media comprises voice.

18. The base station of claim 11 wherein the first communication device comprises a mobile communication device, the second communication device comprises a television, and media comprises video.

19. The base station of claim 11 wherein the first communication device comprises a mobile communication device, the second communication device comprises a computer, and media comprises email.

20. The base station of claim 11 wherein the base station comprises a residential micro-cell base station, and the other base station comprises a public macro-cell base station.

* * * * *